United States Patent [19]

Gehrke et al.

[11] 4,256,460
[45] Mar. 17, 1981

[54] PROCESS FOR DYEING AND PRINTING CELLULOSE FIBRES

[75] Inventors: Günter Gehrke, Cologne; Werner Kühnel, Leverkusen; Robert Kuth, Cologne, all of Fed. Rep. of Germany

[73] Assignee: Bayer Aktiengesellschaft, Leverkusen, Fed. Rep. of Germany

[21] Appl. No.: 81,991

[22] Filed: Oct. 4, 1979

[30] Foreign Application Priority Data

Oct. 18, 1978 [DE] Fed. Rep. of Germany ........ 2845322

[51] Int. Cl.³ .......................... D06P 3/82; D06P 3/60
[52] U.S. Cl. .......................................... 8/532; 8/679; 8/918
[58] Field of Search ...................... 8/21 C, 39 R, 54.2, 8/93, 532, 679, 918

[56] References Cited

U.S. PATENT DOCUMENTS

| | | | |
|---|---|---|---|
| 2,053,274 | 9/1936 | Ellis et al. | 8/40 |
| 3,653,800 | 4/1972 | Blackwell | 8/532 |
| 3,752,645 | 8/1973 | McGuire | 8/21 C |
| 3,752,646 | 8/1973 | Blackwell | 8/21 C |
| 3,752,647 | 8/1973 | Mentzer | 8/21 C |
| 3,759,963 | 9/1973 | McGuire | 8/532 |
| 4,083,684 | 4/1978 | Hansen et al. | 8/532 |

OTHER PUBLICATIONS

Venkataraman, K., "The Chemistry of Synthetic Dyes," vol. III (Academic Press, 1970) pp. 391–403.
Venkataraman, K., "The Chemistry of Synthetic Dyes," vol VIII (Academic Press, 1978) pp. 179–180.

*Primary Examiner*—A. Lionel Clingman
*Attorney, Agent, or Firm*—Sprung, Felfe, Horn, Lynch & Kramer

[57] ABSTRACT

For dyeing and printing cellulose fibres which have been swollen with water-miscible swelling agents or mixed fibres containing these fibres, the fibres are treated with dyestuffs which are free from sulphonic acid groups and carboxylic acid groups, of the general formula

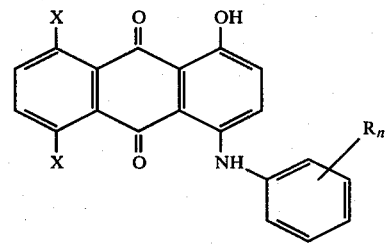

wherein
R represents optionally substituted $C_1$–$C_6$-alkyl, cyclohexyl, $C_1$–$C_4$-alkoxy, phenyl, benzyl, phenylethyl, phenylpropyl or phenoxy, or chlorine or bromine,
n represents 0, 1 or 2,
one X represents OH and the other X represents $NO_2$, $NH_2$ or R'-CONH and R' represents optionally substituted $C_1$–$C_4$-alkyl or phenyl,
and the dyestuffs are fixed by heat treatment.

4 Claims, No Drawings

PROCESS FOR DYEING AND PRINTING CELLULOSE FIBRES

The invention relates to a process for dyeing and printing cellulose fibres which have been swollen with water-miscible swelling agents or mixed fibres containing these fibres.

The process is characterised in that the fibres are treated with a dyestuff of the general formula

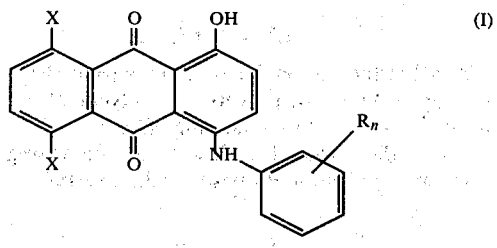

wherein

R represents optionally substituted $C_1$–$C_6$-alkyl, cyclohexyl, $C_1$–$C_4$-alkoxy, phenyl, benzyl, phenylethyl, phenylpropyl or phenoxy, or chlorine or bromine, n represents 0, 1 or 2, one X represents OH and the other X represents $NO_2$, $NH_2$ R′-CONH and R′ represents optionally substituted $C_1$–$C_4$-alkyl or phenyl, and the dyestuff is fixed by heat treatment.

Examples of suitable substituents of the alkyl radicals mentioned are hydroxyl, halogen, such as fluorine, chlorine or bromine, or $C_1$–$C_4$-alkoxy.

The alkoxy radical R can be substituted by, for example, $C_1$–$C_4$-alkoxy or hydroxyl.

Preferred substituents of cyclohexyl are $C_1$–$C_4$-alkyl radicals.

The phenyl radicals mentioned can be substituted by for example, halogen, such as chlorine or bromine, or $C_1$–$C_4$-alkyl.

Examples of possible radicals R are, in addition to chlorine and bromine, methyl, ethyl, n-propyl, isopropyl, n-butyl, sec.-butyl, isobutyl, tert.-butyl, n-pentyl, n-hexyl, cyclohexyl, trifluoromethyl, 2-hydroxyethyl, phenylmethyl, phenylpropyl, methoxy, ethoxy, propoxy, butoxy, 2-hydroxyethoxy, 2-methoxyethoxy, phenyl, methylphenyl, chlorophenyl, phenoxy, methylphenoxy or chlorophenoxy.

R′ can represent, for example, methyl, ethyl, n-propyl, n-butyl, phenyl, methylphenyl or chlorophenyl.

If n represents 2, the radicals R can be different.

The dyestuffs of the formula (I) are prepared in a known manner by reacting a nitro group in 4,8-dinitro-1,5-dihydroxy- and/or 4,5-dinitro-1,8-dihydroxy-anthraquinone with aniline derivatives (compare, for example, U.S. Pat. No. 2,053,274). The second nitro group can optionally be reduced by customary methods, and if appropriate also acylated. For economic reasons, the dyestuffs in which X represents $NO_2$ or $NH_2$ are preferred. Of these, dyestuffs in which R represents chlorine are particularly preferred.

The invention also relates to dyestuff formulations, containing a dyestuff of the formula (I), for dyeing and printing cellulose fibres and cellulose-containing mixed fibres.

The dyestuffs of the formula (I) are free from substituents which render them water-soluble.

Both single dyestuffs I and mixtures of dyestuffs I can be employed in the process according to the invention. The dyestuff mixtures can be obtained either by subsequent mixing or already in the course of the preparation.

The dyestuffs to be used according to the invention are those which are usually employed for dyeing and printing synthetic fibres, such as cellulose ester fibres, polyamide fibres and, above all, polyester fibres, as is described, for example, in German Auslegeschrift No. 1,278,393.

It has now been found that the dyestuffs of the formula (I), which are free from fibre-reactive groups, are outstandingly suitable for dyeing and printing cellulose fibres which can be swollen in water and mixed fibres containing these fibres, when they are supplied by the process known from German Auslegeschrift No. 1,811,796. In this process, the fibres are brought into contact with an amount of water adequate for swelling the cellulose and with a water-miscible swelling agent, before or at the same time as being treated with the dyestuff. The swelling agent must be capable of maintaining the swelling of the cellulose when the water is removed and of dissolving the dyestuff at the dyeing temperature, if necessary with the aid of an additional solvent. The swelling agent is generally added in an amount of 10–30% by weight, relative to the cellulose fibres. Suitable swelling agents have a boiling point above 150° C.

The dyestuff and swelling agent can be applied simultaneously to the fibre, or the fibre can be treated first with the swelling agent and then with the aqueous dyestuff dispersion.

Finally, the dyestuff is fixed by heat treatment, in particular at 150°–230° C.

The dyestuff can also be transferred from a temporary support by the transfer printing process, such as is described, for example, in French Patent Specifications Nos. 1,223,330, 1,334,829 and 1,585,119, by the action of heat on the substrate, which has been pre-treated with the swelling agent.

The process is suitable for dyeing and printing both natural cellulose and regenerated cellulose.

The process is of particular interest for dyeing and printing mixed fibres of cellulose and synthetic fibres, such as polyamide fibres and polyester fibres, in particular cotton/polyester mixed fibres, since it makes matching-shade dyeing or printing in a one-stage procedure possible.

Processes of this type and other auxiliaries and dyestuffs which can be used instead of the products mentioned in German Auslegeschrift 1,811,796 are known, for example, from German Offenlegungsschriften Nos. 2,050,961, 2,524,243, 2,528,743, 2,705,116 and 2,751,830 and U.S. Patent Nos. 3,752,645, 3,752,646 and 3,752,647.

The dyestuffs (I) give blue dyeings and prints with colour shades which match well on the mixed fibres. They are distinguished by very good fastness properties, and, besides fastness to washing, fastness to sublimation, light and dry cleaning may be singled out, above all.

Besides water, the dyestuff formulations according to the invention can contain the usual constituents, such as dispersing agents, for example non-ionic and/or anionic and/or cationic dispersing agents, thickeners and/or swelling agents and/or dyestuff solubilising agents.

The parts mentioned in the examples below are parts by weight and the degrees are degrees Centigrade.

EXAMPLE 1

A polyester/cotton 65:35 fabric is printed with the following printing paste: 1–50 parts of a 30% strength paste of the dyestuff of the formula

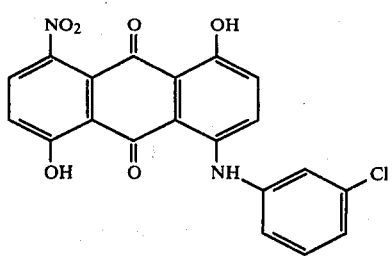

100 parts of a boric acid ester of a polyethylene glycol, 500 parts of a 4% strength alginate thickener and 399–350 parts of water.

The fabric is then dried, the dyestuff is fixed at 210° with dry heat for 1 minute and the fabric is rinsed, soaped, rinsed again and dried. A blue sharply contoured print which is fast to light is obtained.

The dyestuff paste employed can be obtained as follows: 300 parts of the above dyestuff are dispersed with 60–90 parts of a non-ionic dispersing agent and 640–610 parts of water in a ball mill or another suitable apparatus.

Preservatives and, in order to prevent too rapid drying, glycols or glycerol can also be added to this paste.

EXAMPLES 2–21

The procedure followed is as described in Example 1, but the dyestuffs of the formula

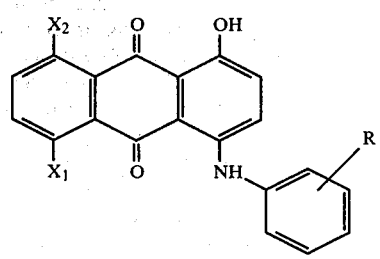

described in the tables below are used.

Prints which are fast to washing are obtained in the colour shades indicated in the table.

| Example No. | $X_1$ | $X_2$ | R | Colour shade |
| --- | --- | --- | --- | --- |
| 2 | $NO_2$ | OH | H | blue |
| 3 | OH | $NO_2$ | 3-$CH_3$ | blue |
| 4 | $NO_2$ | OH | 2-$C_2H_5$ | blue |
| 5 | OH | $NO_2$ | 4-$C(CH_3)_3$ | blue |
| 6 | $NO_2$ | OH | 4-$C_6H_{11}$ | blue |
| 7 | OH | $NO_2$ | 3-$OCH_3$ | blue |
| 8 | $NO_2$ | OH | 2-$OC_2H_5$ | blue |
| 9 | OH | $NO_2$ | 4-$OC_2H_4OH$ | blue |
| 10 | $NO_2$ | OH | 3-$CF_3$ | blue |
| 11 | OH | $NO_2$ | 4-$C(CH_3)_2C_6H_5$ | blue |
| 12 | $NO_2$ | OH | 4-$C_6H_5$ | blue |
| 13 | OH | $NO_2$ | 4-$OC_6H_5$ | blue |
| 14 | $NO_2$ | OH | 2-Cl | blue |
| 15 | OH | $NO_2$ | 4-Cl | blue |
| 16 | $NO_2$ | OH | 4-Br | blue |
| 17 | OH | $NO_2$ | 2,4-$(CH_3)_2$ | blue |
| 18 | $NO_2$ | OH | 2-$CH_3$-6-$C_2H_5$ | reddish-tinged blue |
| 19 | OH | $NO_2$ | 2,4-$(Cl)_2$ | blue |
| 20 | OH | $NO_2$ | 3,4-$(Cl)_2$ | blue |
| 21 | $NO_2$ | OH | 2-$CH_3$-5-Cl | blue |

EXAMPLE 22

A polyester/cotton 50:50 fabric is padded with 10% strength solution of polyethylene glycol of molecular weight ∼ 400, with a squeezing effect of ∼ 100%. The fabric is then printed with a paste comprising 1–100 parts of a 30% strength paste of the dyestuff

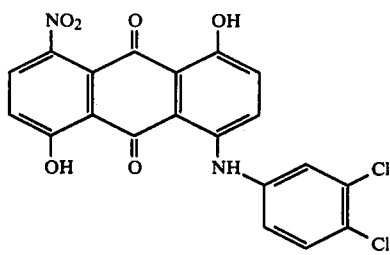

40–50 parts of a thickener concentrate which essentially consists of polyacrylic acid which has been broken down under alkaline conditions, and 900 parts of water.

The fabric is then dried and the dyestuff is mixed at 175° C. with high-temperature steam for 6 minutes. After rinsing, soaping and rinsing again, a blue print with good fastness properties is obtained.

The dyestuff paste can be obtained analogously to the statements in Example 1.

EXAMPLES 23–36

The procedure followed is as indicated in Example 22, but the dyestuffs of the formula

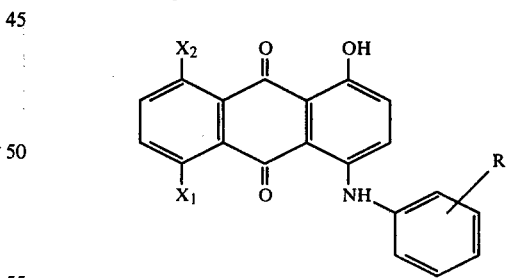

described in the table below are used. Prints which have good fastness properties and the colour shades given in the last column are obtained.

| Example No. | $X_1$ | $X_2$ | R | Colour shade |
| --- | --- | --- | --- | --- |
| 23 | OH | $NH_2$ | H | blue |
| 24 | $NH_2$ | OH | 2-$CH_5$ | blue |
| 25 | OH | $NH_2$ | 4-$(CH_2)_3CH_3$ | blue |
| 26 | $NH_2$ | OH | 4-$CH_2CH_2OH$ | blue |
| 27 | OH | $NH_2$ | 2-$OCH_3$ | blue |
| 28 | $NH_2$ | OH | 4-$O(CH_2)_3CH_3$ | blue |
| 29 | OH | $NH_2$ | 2-$OC_6H_5$ | blue |

-continued

| Example No. | $X_1$ | $X_2$ | R | Colour shade |
|---|---|---|---|---|
| 30 | $NH_2$ | OH | 2-Cl | blue |
| 31 | OH | $NH_2$ | 3-Cl | blue |
| 32 | $NH_2$ | OH | 4-Cl | blue |
| 33 | OH | $NH_2$ | 2,4-$(Cl)_2$ | blue |
| 34 | $NH_2$ | OH | 2-$CH_3$-4-Cl | blue |
| 35 | $CH_3CONH$ | OH | 3-Cl | blue |
| 36 | OH | $C_6H_5CONH$ | 2-$C_2H_5$ | blue |

EXAMPLE 37

30 parts by weight of the dyestuff

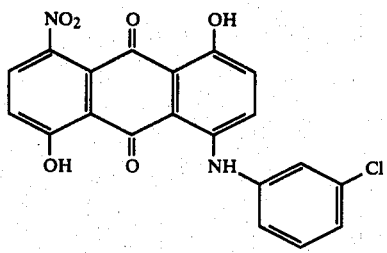

are finely dispersed with 15 parts by weight of a reaction product of abietic acid with about 50 mols of ethylene oxide, and 55 parts of water with the aid of a bead mill. The following dye liquor is prepared from this finished dyestuff:

| |
|---|
| 70 parts of the dyestuff formulation |
| 100 parts of a polyethylene glycol of molecular weight 500 |
| 10 parts of a 10% strength aqueous solution of a polyacrylate in |
| 820 parts of water |
| 1000 parts |

A polyester/cotton mixed fibre with a polyester:cotton ratio of 65:35 to 50:50 is impregnated with the aid of a padder, the liquor pick-up of the fabric being 35-50%. The fabric treated in this manner is dried and the dyestuff is fixed on both fibres by a hot air treatment in a thermosol unit at 215° C. for 60 seconds.

After the usual after-treatment by soaping at 60° C. and after drying, a full blue colour shade which matches very well on the two materials is obtained. The dyeing produced has good fastness to daylight and fastness to dry rubbing and wet rubbing and very good fastness to washing.

EXAMPLE 38

(A) 75 g of the dyestuff of the formula

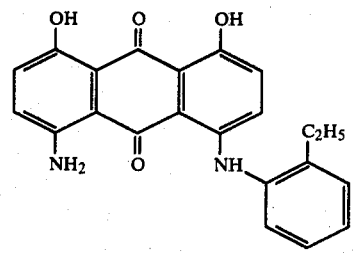

50 g of an anionic dispersing agent, for example a lignin-sulphonate or a condensation product of naphthalenesulphonic acid and formaldehyde, and 100 ml of water are mixed and the mixture is converted into a finely divided form by grinding for 10 hours in a ball mill.

The resulting dispersion containing 33% of crude dye is stable on storage.

(B) The aqueous dispersion obtained according to (A) can be processed to a printing paste as follows.

50-200 of the dispersion are made into a paste with 400 g of a 10% strength carob bean flour ether thickener and 550-400 ml of water.

(C) Paper is printed by the gravure printing process using this printing paste.

(D) A polyester/cotton 65:35 fabric is impregnated with an aqueous solution of 120 g/l of polyethylene glycol of molecular weight 400, squeezed off to a liquor pick-up of 100% and dried.

(E) The paper obtained according to (C) is pressed together with the fabric impregnated according to (D) at 215° for 60 seconds. A clear blue print is obtained.

We claim:

1. In the dyeing and printing of cellulose fibres alone or admixed with other fibers by swelling said fibres with a water-miscible swelling agent capable of maintaining the fibers in swollen condition after removal of water, boiling above 150° C. and, treating the swollen fibres with a dyestuff, and fixing the dyestuff by heat treatment, the improvement which comprises employing as said dyestuff a compound of the formula

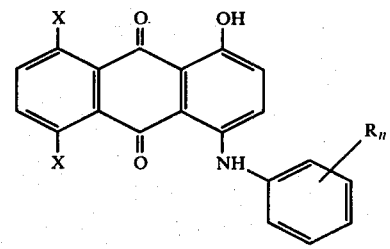

wherein
R is optionally substituted $C_1$–$C_6$-alkyl, cyclohexyl, $C_1$–$C_4$-alkoxy, phenyl, benzyl, phenylethyl, phenylpropyl or phenoxy, or chlorine or bromine,
n is 0, 1 or 2,
one X is OH and
the other X is $NO_2$, $NH_2$ or R'-COHN, and
R' is optionally substituted $C_1$–$C_4$-alkyl or phenyl.

2. Process according to claim 1, characterized in that one X represents $NO_2$ or $NH_2$.

3. Process according to claim 1, characterized in that one X represents $NO_2$.

4. Process according to claim 2, characterized in that R represents Cl.

* * * * *